(12) United States Patent
Chen et al.

(10) Patent No.: US 9,627,918 B2
(45) Date of Patent: Apr. 18, 2017

(54) WIRELESS CHARGER HAVING MOVEABLE TRANSMITTER COIL

(71) Applicant: FOXCONN INTERCONNECT TECHNOLOGY LIMITED, Grand Cayman (KY)

(72) Inventors: Cheng-Pang Chen, New Taipei (TW); Feng Zhou, Kunshan (CN); Wei Ren, Kunshan (CN); Chi-Ming Chen, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 154 days.

(21) Appl. No.: 14/583,822

(22) Filed: Dec. 29, 2014

(65) Prior Publication Data

US 2015/0188356 A1    Jul. 2, 2015

(30) Foreign Application Priority Data

Jan. 2, 2014    (TW) .............................. 103100013 A (51) Int. Cl.
*H02J 7/00*  (2006.01)
*H02J 7/02*  (2016.01)
*H02J 5/00*  (2016.01)

(52) U.S. Cl.
CPC .............. *H02J 7/025* (2013.01); *H02J 5/005* (2013.01); *H02J 7/0042* (2013.01)

(58) Field of Classification Search
CPC   H02J 5/005; H02J 7/025; H01F 38/14; Y02T 90/122; B60L 11/182; Y02E 60/12
USPC .......................................................... 320/108
See application file for complete search history.

(56) References Cited

U.S. PATENT DOCUMENTS

| | | |
|---|---|---|
| 5,923,544 A | 7/1999 | Urano |
| 7,352,567 B2 | 4/2008 | Hotelling et al. |
| 7,715,187 B2 | 5/2010 | Hotelling et al. |
| 8,698,454 B2 | 4/2014 | Lee et al. |
| 2009/0079387 A1* | 3/2009 | Jin ........................ H02J 7/0004 320/108 |
| 2011/0074344 A1 | 3/2011 | Park et al. |
| 2011/0156638 A1* | 6/2011 | Thorsell ................ B60N 3/002 320/108 |
| 2011/0316353 A1 | 12/2011 | Ichikawa et al. |
| 2013/0088193 A1 | 4/2013 | Chen |

FOREIGN PATENT DOCUMENTS

CN    102510110 A    6/2012

\* cited by examiner

*Primary Examiner* — Arun Williams
(74) *Attorney, Agent, or Firm* — Wei Te Chung; Ming Chieh Chang (57) ABSTRACT

A wireless charger used for charging a portable electronic device with a receiver coil includes a wireless charging body, a transmitter coil, and a shaft. The charging body has a front body to support the portable electronic device and a rear body coordinated with the front body to form a receiving cavity for receiving transmitter coil. The rear body defines a track for the shaft disposing therein and moving the transmitter coil to align with the receiver coil. The wireless charger could align with receiver coils of different portable electronic devices.

20 Claims, 10 Drawing Sheets

WIRELESS CHARGER HAVING MOVEABLE TRANSMITTER COIL

BACKGROUND OF THE INVENTION

1. Field of the Invention

The present invention relates to a wireless charger having transmitter coil, and more particularly to means for moving the transmitter coil.

2. Description of Related Art

U.S. Pat. No. 7,352,567, issued on Apr. 1, 2008, discloses a docking system including a portable electronic device and a docking station. The docking station transfers power to the portable electronic device through inductive charging (i.e., wireless charging). The portable electronic device could be placed onto the docking station in a horizontal direction or a vertical direction about an axis. The docking system includes a transmitter coil therein, and the docking station includes a receiver coil therein. The transmitter coil could be aligned with the receiver coil in multiple directions about the axis through disposing the transmitter coil at a calculated specific fixed position. This docking system could align the transmitter coil and the receiver coil for same portable electronic device at multiple orientations. However, a consumer often has more than one portable electronic devices and requires inductively charging these portable electronic devices on a same docking station. The above docking system could not meet the demand of aligning its transmitter coil with various receiver coils of different portable electronic devices. Efficiency of inductive charging is poor when a transmitter coil does not align with a receiver coil of portable electronic device.

Hence, a wireless charger having a moveable transmitter coil to align with receiver coils of different portable electronic devices is desired.

SUMMARY OF THE INVENTION

Accordingly, an object of the present invention is to provide a wireless charger used for charging a portable electronic device with a receiver coil. The wireless charger includes a wireless charging body, a transmitter coil, and a shaft. The charging body has a front body to support the portable electronic device and a rear body coordinated with the front body to form a receiving cavity for receiving transmitter coil. The rear body defines a track for the shaft disposing therein and moving the transmitter coil to align with the receiver coil. The wireless charger could align with receiver coils of different portable electronic devices.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Referring to FIGS. 1-10, a wireless charger 100 according to the present invention is shown. The wireless charger 100 is used to charge a portable electronic device 200, which has a receiver coil (not shown). The wireless charger 100 includes a front body 1, a rear body 2, a transmitter coil assembly 3, and a shaft 4. The front body 1 is used to support the portable electronic device. The transmitter coil assembly 3 is used to inductively charge the receiver coil of portable electronic device 200. The transmitter coil assembly 3 and the receiver coil form a transformer therebetween for a wireless power transmission between the wireless charger 100 and the portable electronic device 200. The shaft 4 could drive the transmitter coil assembly 3 to align with the receiver coil of portable electronic device 200.

Figure 1:
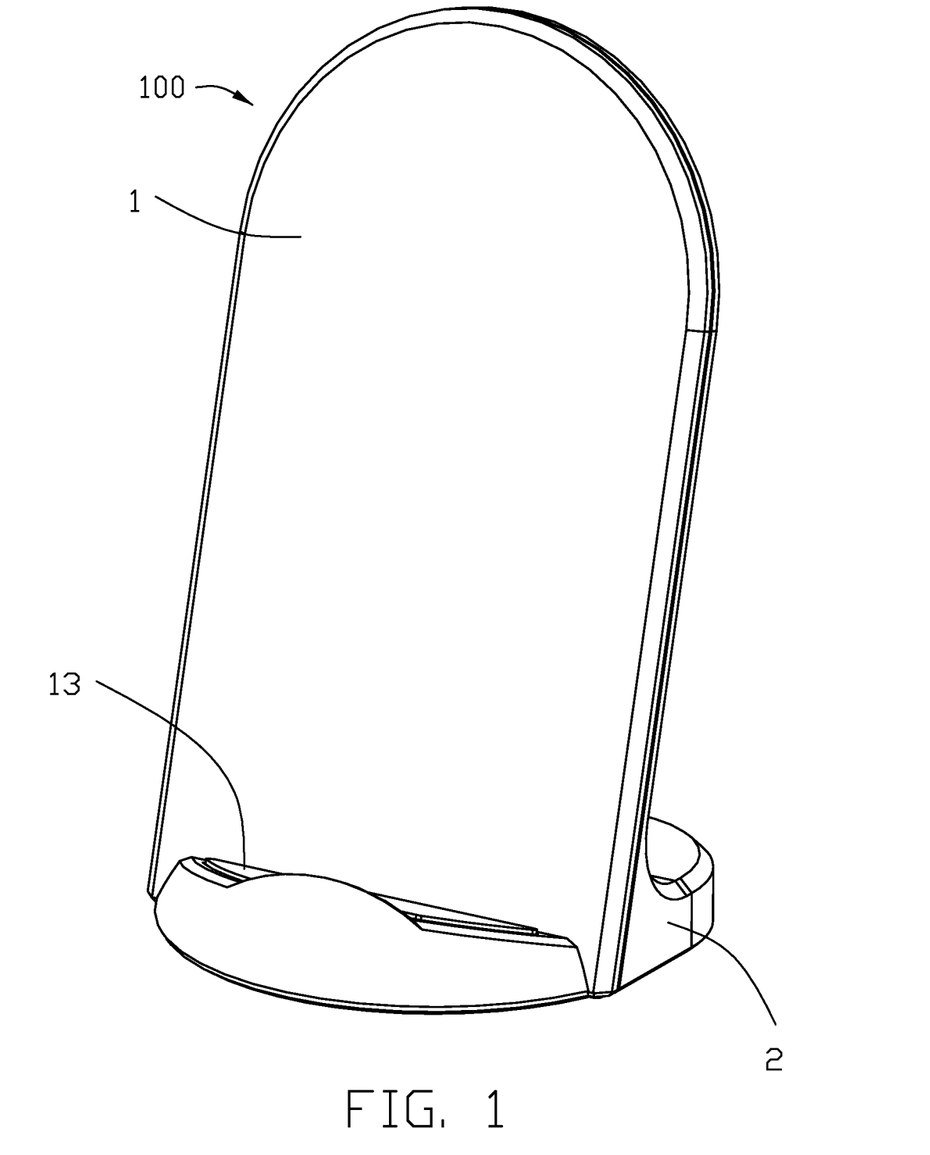
FIG. 1 is a perspective view of a wireless charger according to the present invention.
Figure 2:
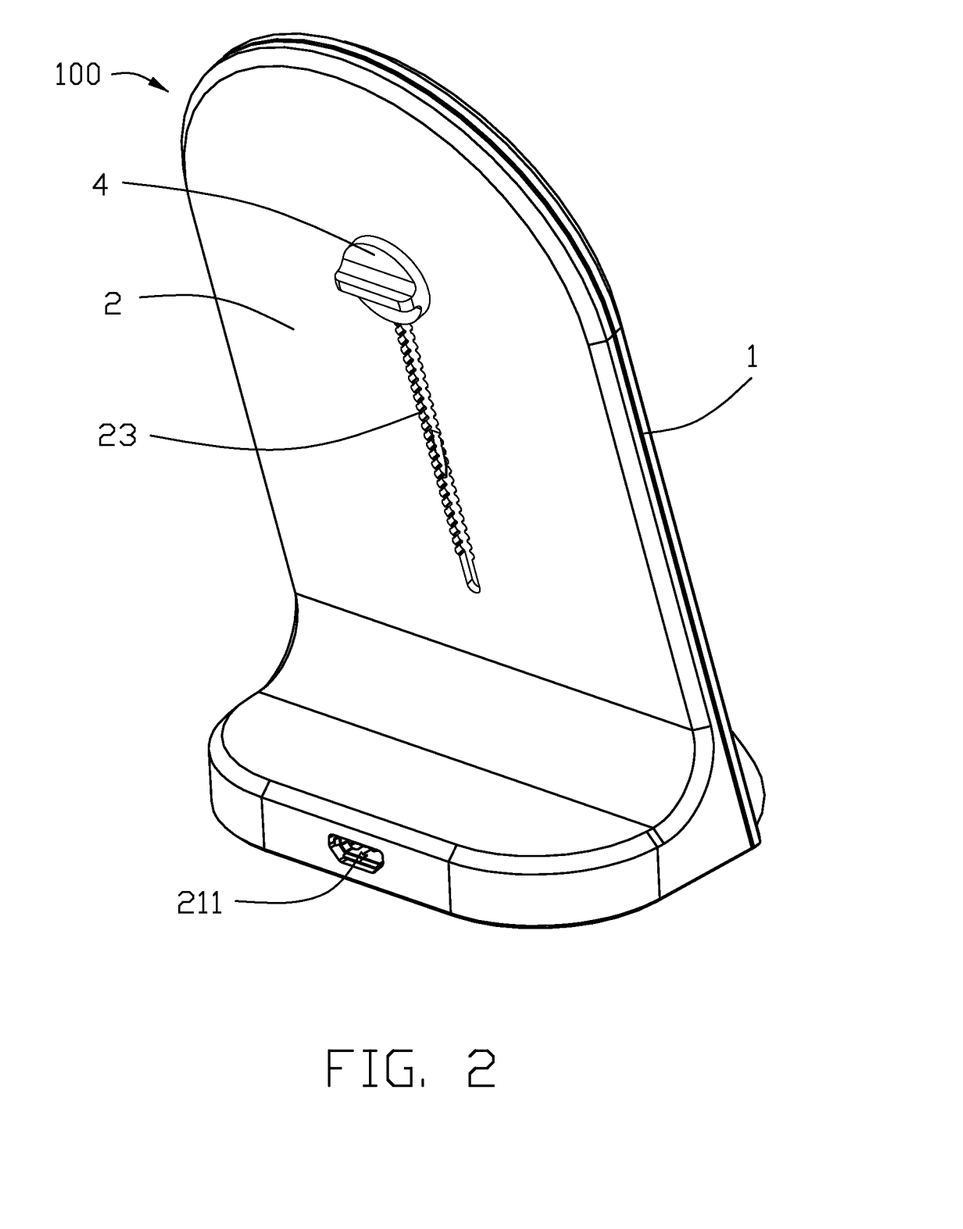
FIG. 2 is another perspective view of the wireless charger shown in FIG. 1.
Figure 3:
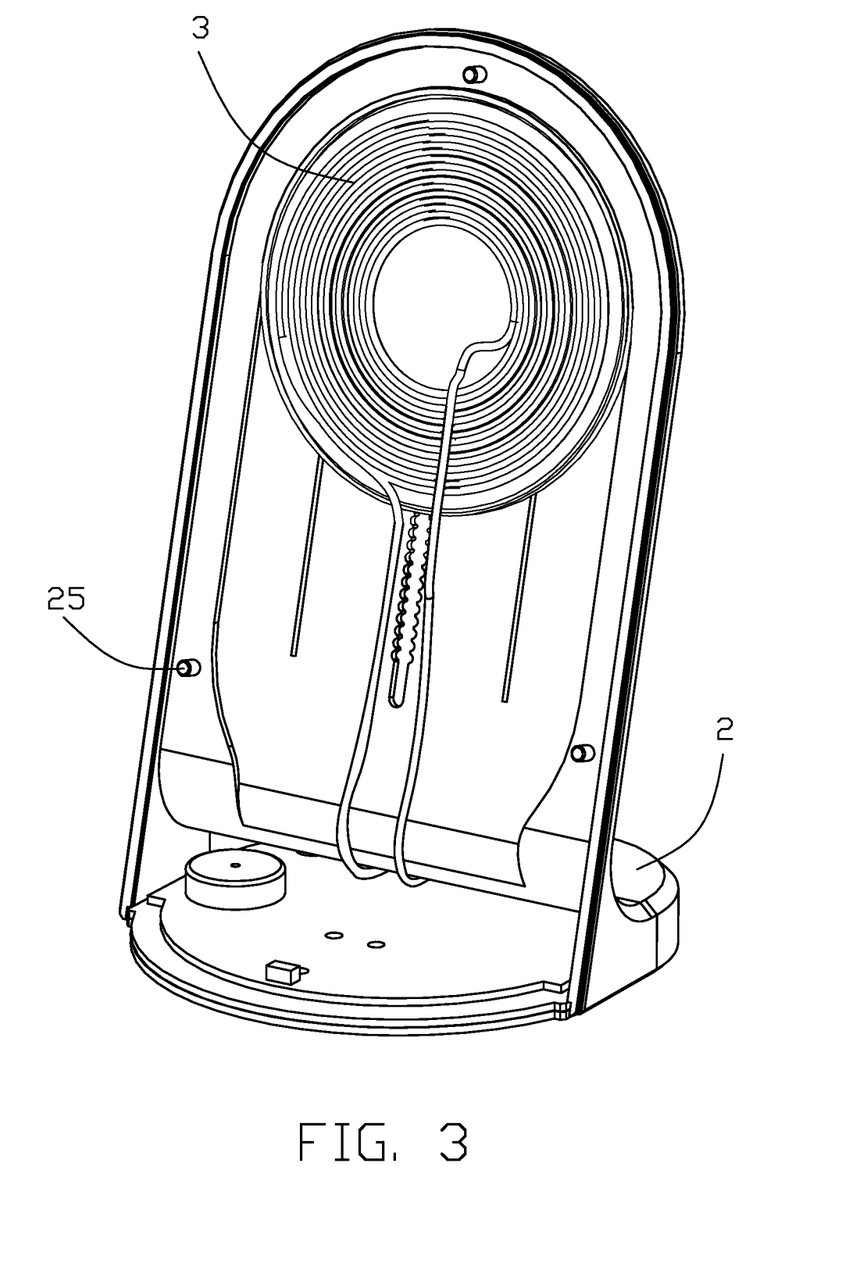
FIG. 3 is a perspective view of the wireless charger shown in FIG. 1, with a front body being removed.
Figure 4:
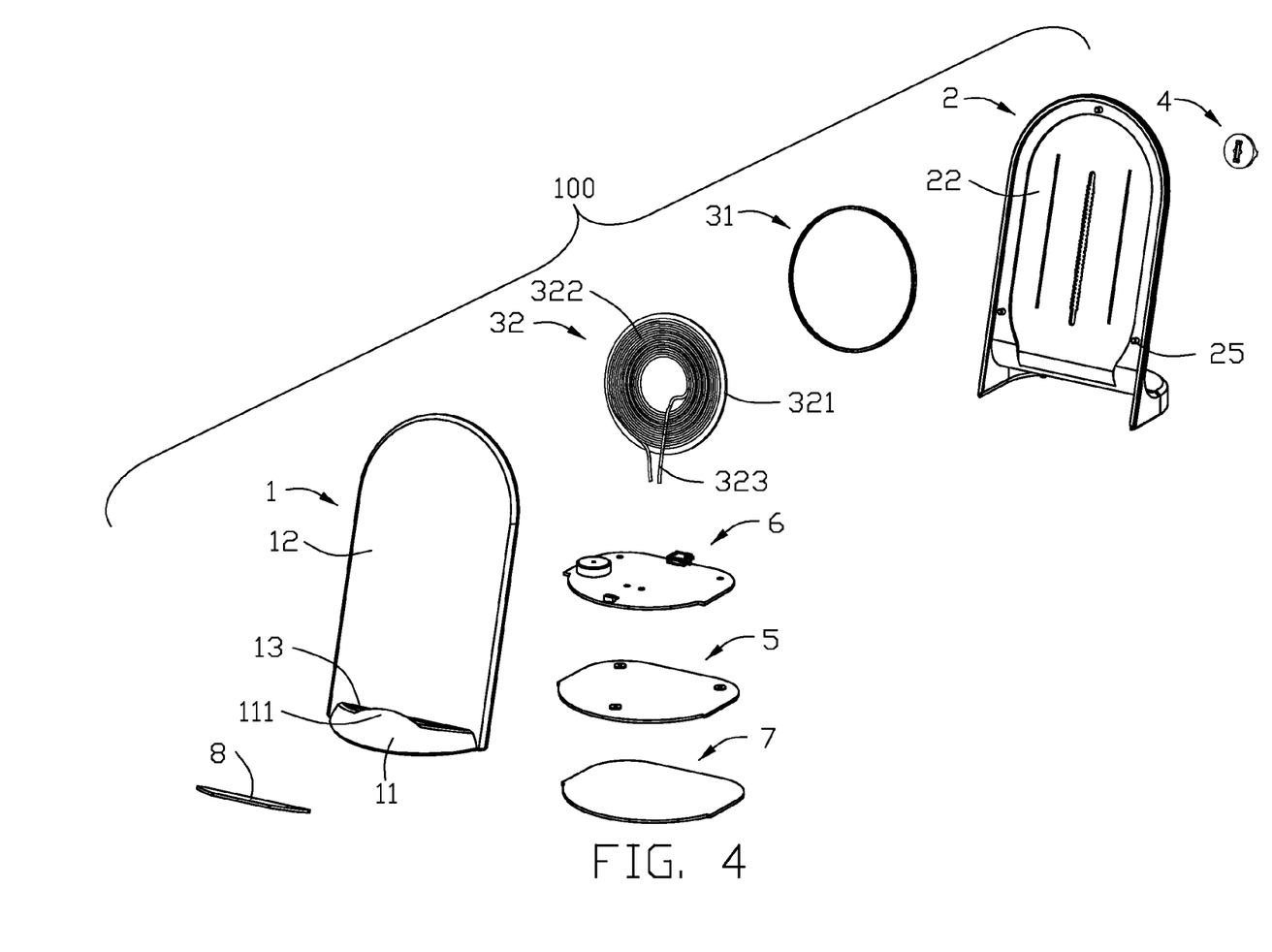
FIG. 4 is an exploded view of the wireless charger shown in FIG. 1.
Figure 5:
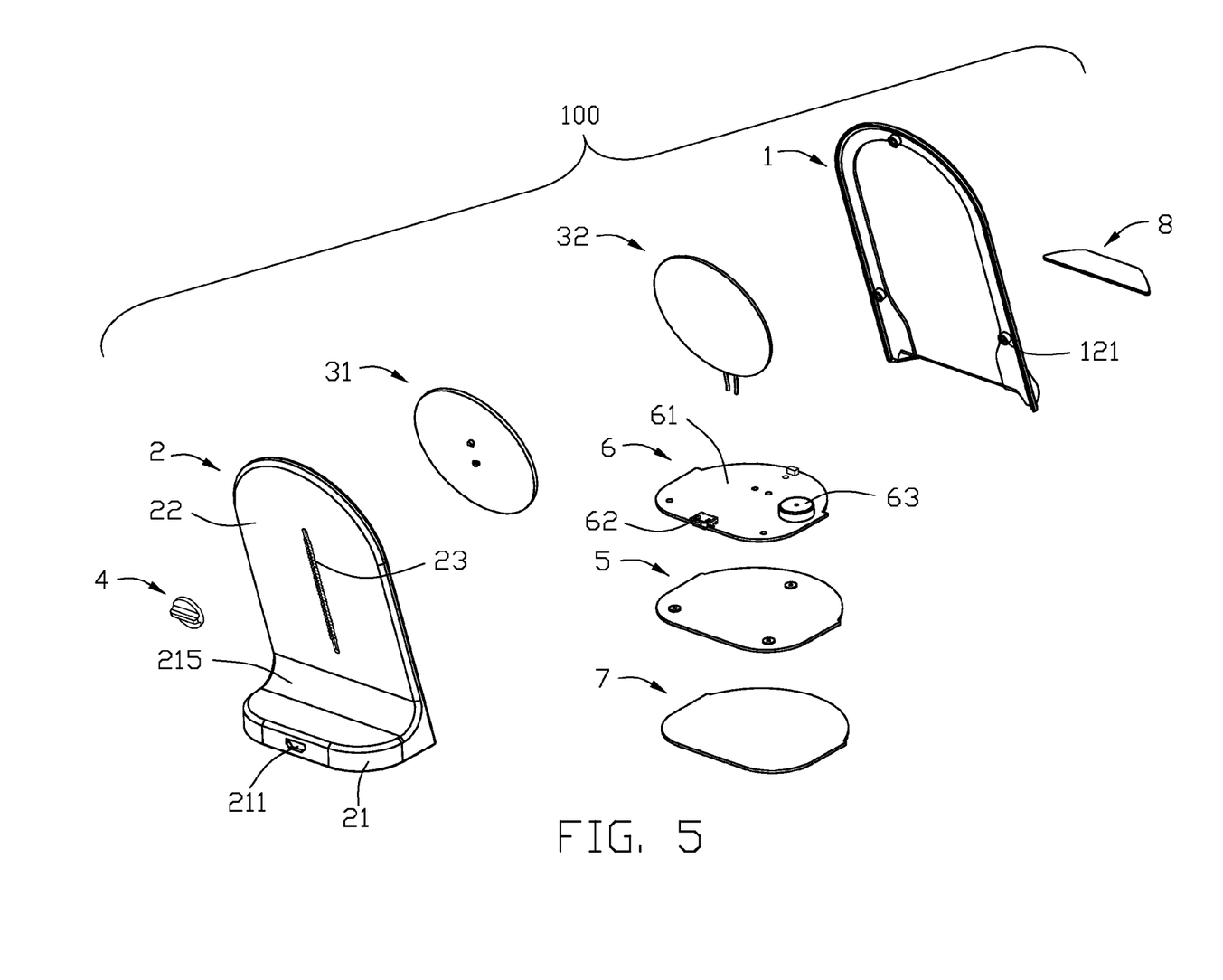
FIG. 5 is another exploded view of the wireless charger shown in FIG. 4.

Referring to FIGS. 4-5, the front body 1 includes a platform portion 11 and a supporting portion 12 extending therefrom backwardly and upwardly to form thereon a charging area transversely exposed to an exterior. The platform portion 11 has a projection 111 protruding upwardly from a front edge thereof, which cooperates with the supporting portion 12 to define a receiving slot 13, and the receiving slot 13 is used to receive the portable electronic device 200. The projection portion 111 limits the portable electronic device 200 within the receiving slot 13 and prevents the portable electronic device 200 move forwardly. The support portion 12 has a plurality of retention posts 121 projecting backwardly from a rear side thereof.

The rear body 2 is assembled with the front body 1 to define a receiving chamber, which receives the transmitter coil assembly 3. Certainly, the front body 1 and the rear body 2 also could be injection molded as a whole. The rear body 2 has a horizontal portion 21 and an oblique portion 22 extending backwardly and upwardly from a front section of the horizontal portion 21. The oblique portion 22 cooperates with the supporting portion 12 to define a top receiving chamber for the transmitter coil assembly 3 moving therein. The horizontal portion 21 cooperates with the platform portion 11 to define a bottom receiving chamber to receive other components of the wireless charger 100. The oblique portion 22 has a plurality of mounting posts 25 inserted into corresponding holes of the retention posts 121.

Figure 6:
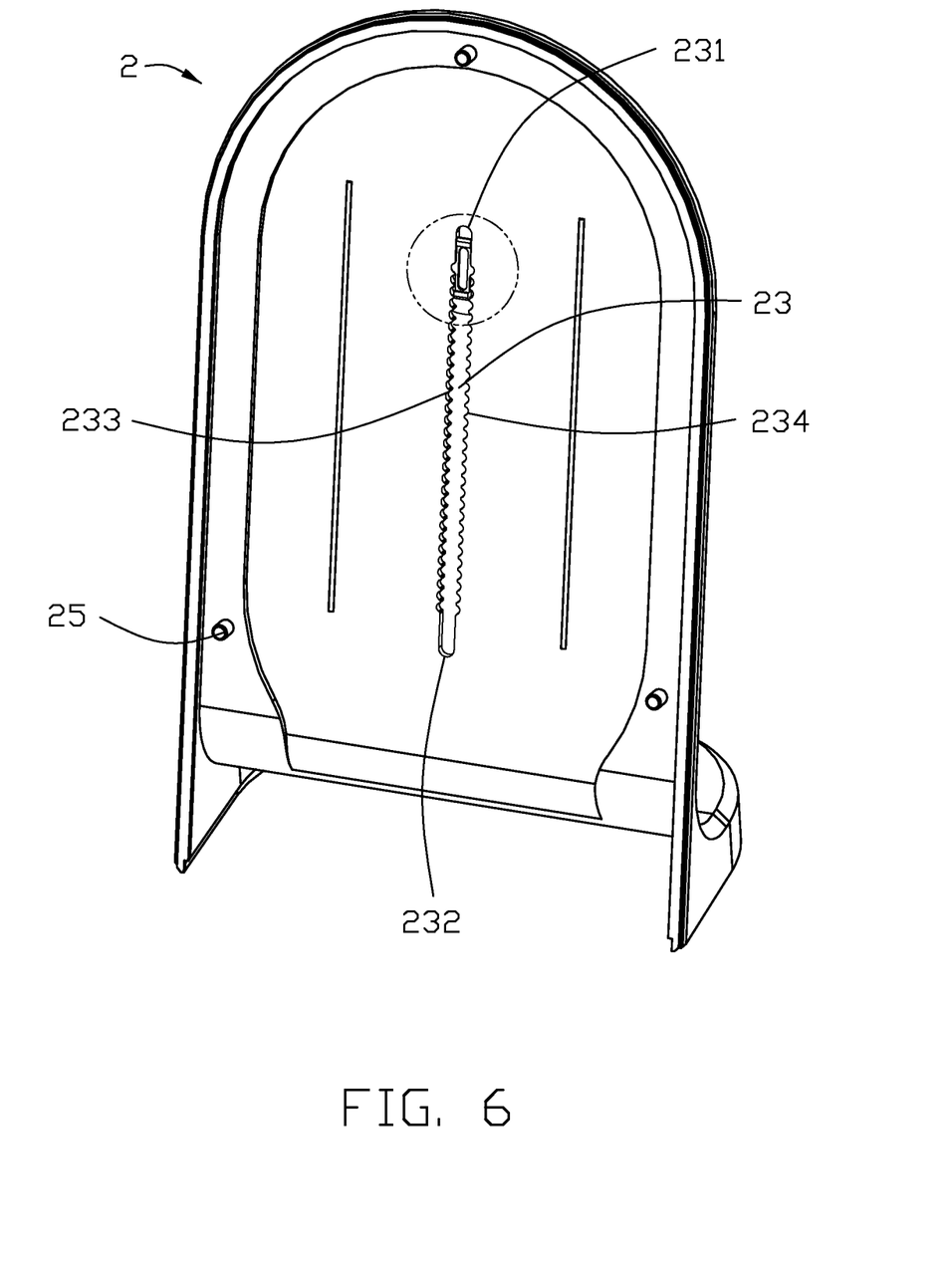
FIG. 6 is a perspective view of a shaft assembled with a rear body shown in FIG. 4.
Figure 7:
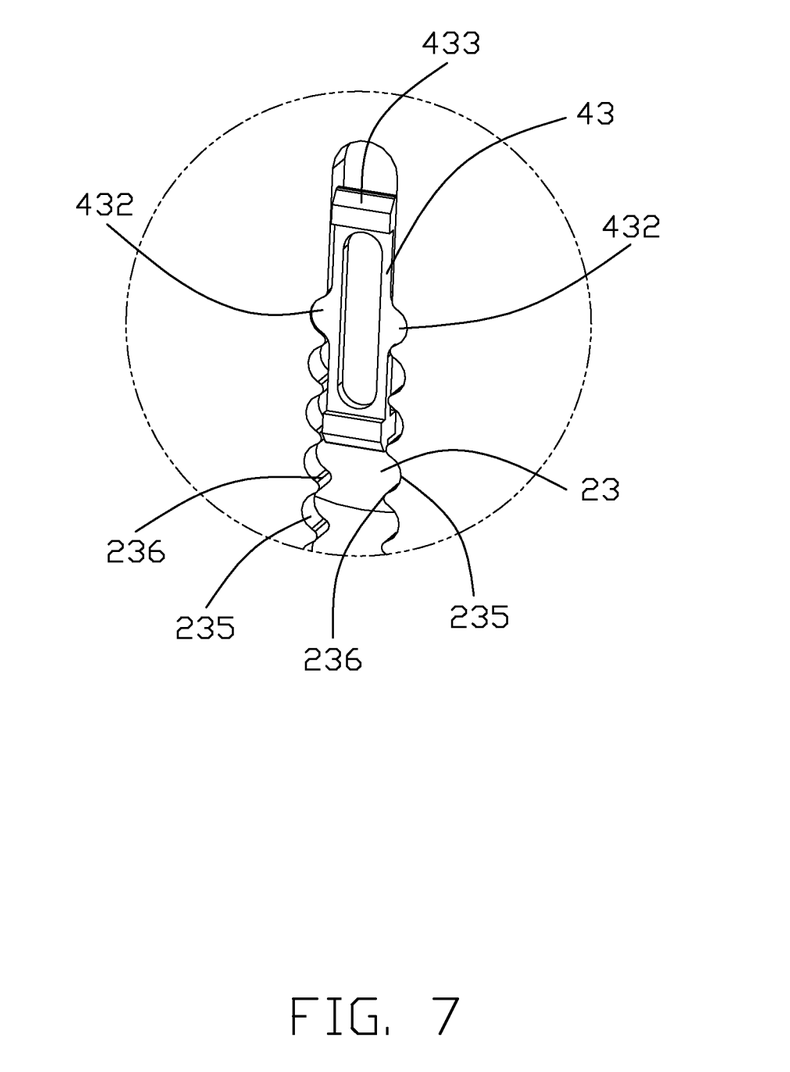
FIG. 7 is an enlarged view of the circled portion in FIG. 6.

Referring to FIGS. 5-7, the horizontal portion 21 has a power port 211 extending therethrough along a front-to-back direction for inserting an exterior power plug connector therein. The rear body 2 includes a smooth arc portion 215 connecting the horizontal portion 21 with the oblique portion 22. The oblique portion 22 includes an inner face, an outer face, and a track 23 extending therethrough along a direction perpendicular to the inner and outer faces. The track 23 is essentially in the form of a sliding slot which is defined by a top edge 231, a bottom edge 232, a first sliding edge 233 located between the top and bottom edges, and a second sliding edge 234 facing to the first sliding edge 233. The top edge 231 is an upwardly projecting semicircle, and the bottom edge 232 is a downwardly projecting semicircle. Each of sliding edges 231, 232 has a serrated structure with a repeatedly staggered notched portions 235 and toothed portions 236

Figure 8:
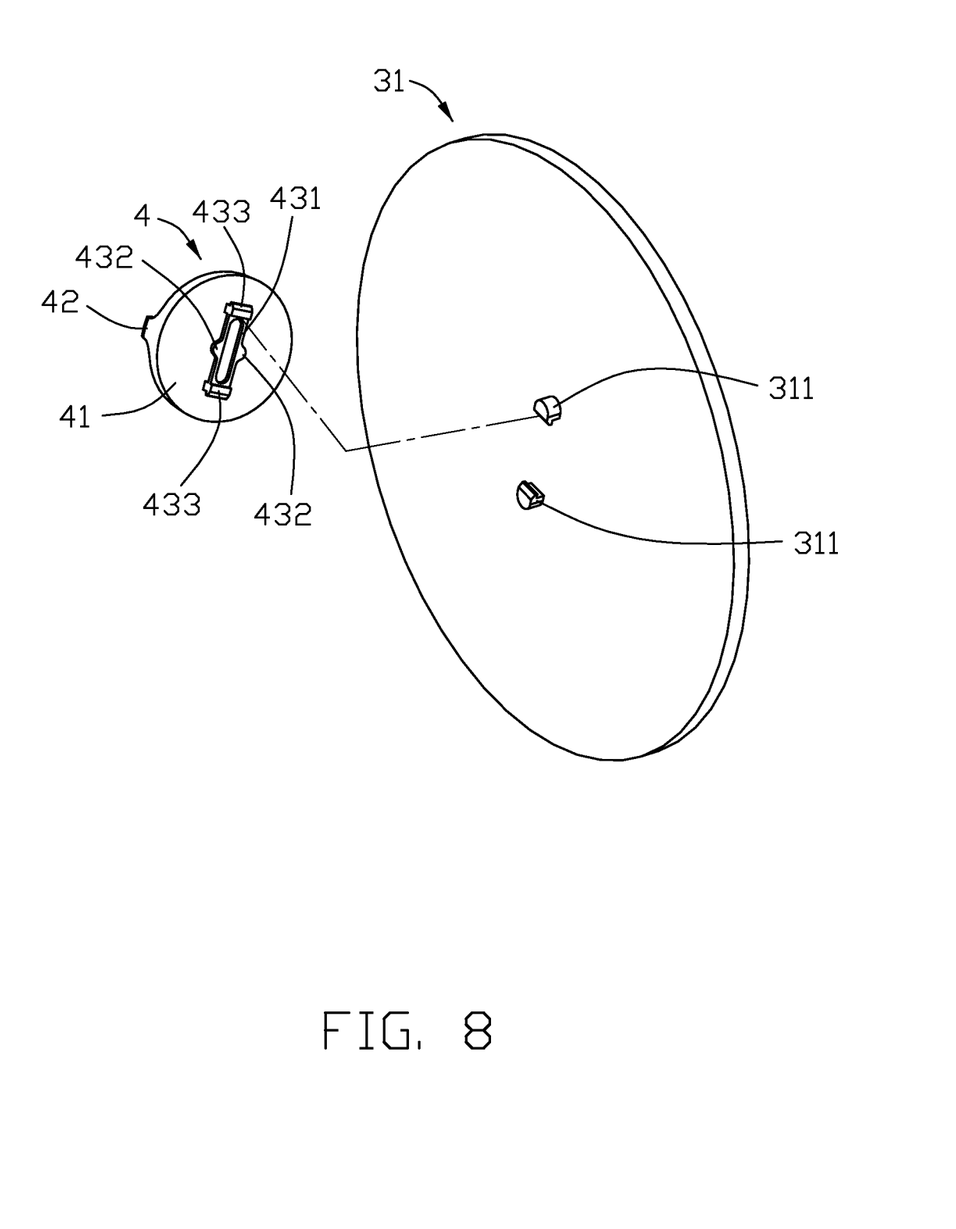
FIG. 8 is a perspective view of a moving tray and the shaft.

Referring to FIGS. 4, 5, and 8, the shaft 4 is mounted within the track 23 to drive the transmitter coil assembly 3 moving along the first and second sliding edges 231, 232. The transmitter coil assembly 3 includes a planar magnetic core 321, a plurality of spiral coils 322 pasted to a front face of the magnetic core 321, and a moving tray 31 holding the magnetic core 321. The planar magnetic core 321 is a flexible sheet. The planar magnetic core 321 is glued to a front recess of the moving tray 31. The spiral coil 322 has two opposite ends 323 to connect with other components. The moving tray 31 is secured with shaft 4. The moving tray 31 has a pair of retaining hooks 311 protruding backwardly from a rear face thereof.

Referring to FIGS. 7-8, the shaft 4 includes a disk-shaped main body 41, a grip portion 42 extending backwardly from the main body 41, and a mating block 43 extending forwardly from the main body 41. The grip portion 42 is grabbed by an operator to drive the mating block 43 moving along the track 23. The mating block 43 includes a sliding body 431 sliding in the track 23, a pair of positioning blocks 432 projecting from side edges of the sliding body 431 toward to the first and second sliding edges 231, 232, and a pair of locking hooks 433 extending oppositely from a top edge and a bottom edge of the sliding body 431. The positioning blocks 432 could be retained in any two face-to-face notched portions 235 so that the shaft 4 and the transmitter coil 32 could stay many positions within the track 23. The locking hooks 433 locks with the retaining hooks 311.

Referring to FIGS. 4-5, the wireless charger 100 also has a bottom lid 5 mounted to the bottom of the front and rear bodies' 1, 2, a circuit board assembly 6 mounted on a top side of the circuit board assembly 6, a first rubber mat 7 mounted below the circuit board assembly 6, and a second rubber mat 8 disposed in the receiving slot 13. The circuit board assembly 6 includes a printed circuit board 61, a receptacle connector 62 mounted on the printed circuit board 61, and a buzzer 63 seated on the printed circuit board 61. The receptacle connector 62 could connect with an exterior plug power connector (not shown). The spiral coils 322 electrically connect to exterior plug power connector through the printed circuit board 61.

Figure 9:
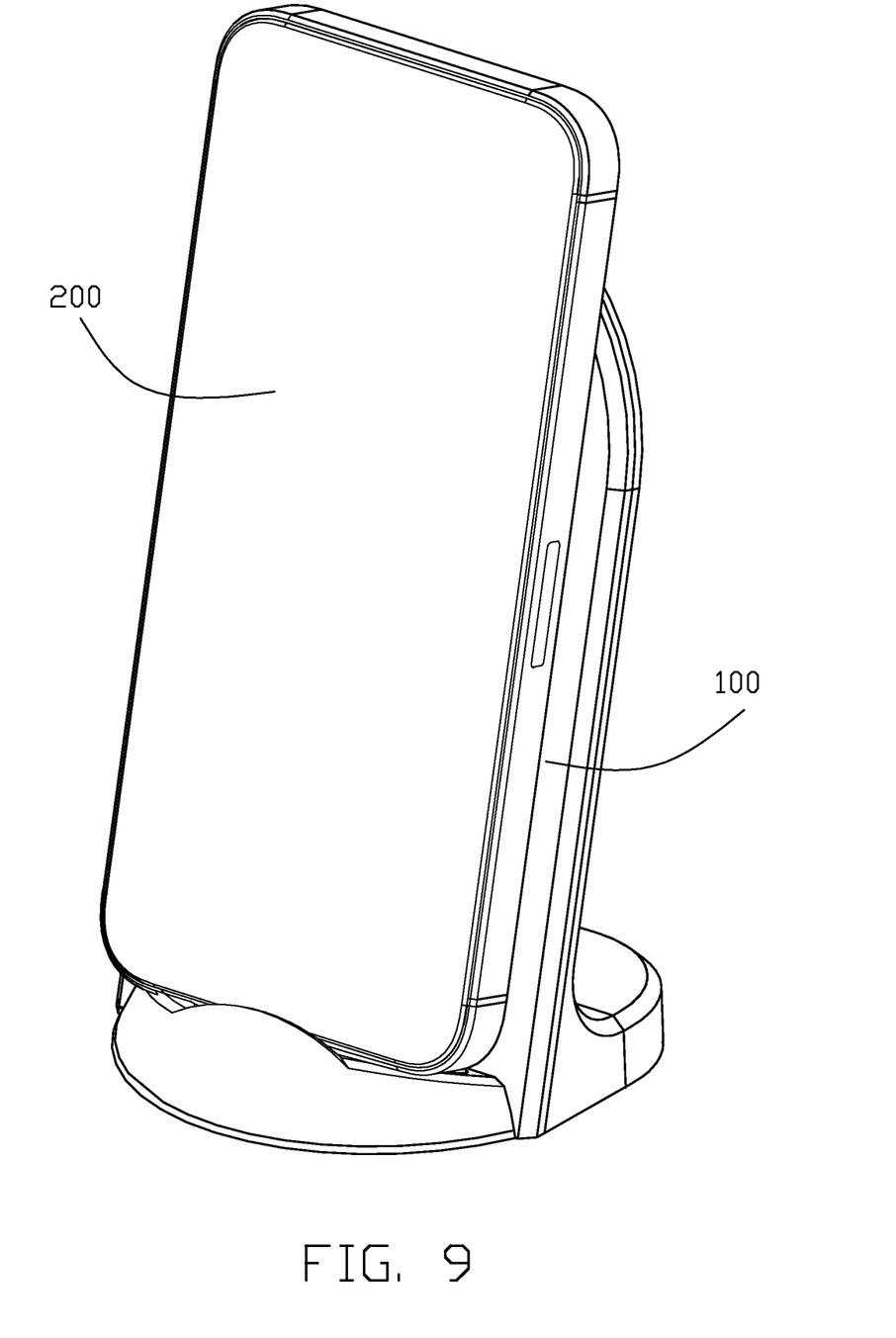
FIG. 9 is a perspective view of a portable electronic device vertically placed on the wireless charger.
Figure 10:
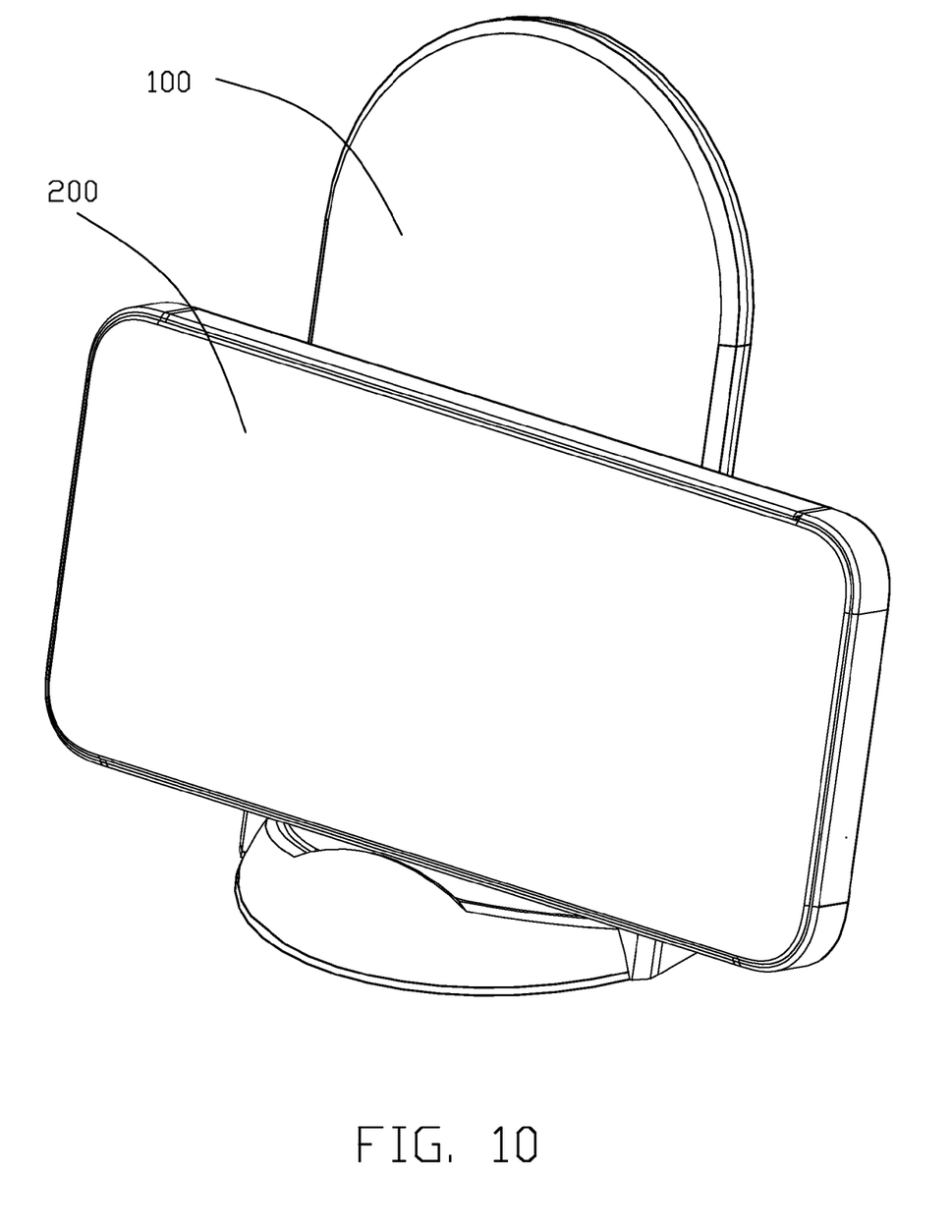
FIG. 10 is a perspective view of a portable electronic device horizontally placed on the wireless charger.

Referring to FIGS. 9-10, the portable electronic device 200 may be laterally or vertically placed on the wireless charger for inductive charging under condition that the receiver coil in the electronic device is positioned at different places, and the shaft 4 is used to adjust the position of the transmitter coil to align with the receiver coil for improving wireless charging efficiency. The portable electronic device 200 may be a mobile phone or a tablet PC. Understandably, because the charging area of the front body 1 is essentially fully open to an exterior without restriction in either the vertical direction or the longitudinal direction perpendicular to the vertical direction, except the super large sized one, differently sized electronic devices may be used with this wireless charger as long as the receiving coil of the electronic device 200 is intentionally positioned on the line defined along the track 23.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the members in which the appended claims are expressed.

What is claimed is:

1. A wireless charger used for charging a portable electronic device with a receiver coil, comprising:
   a wireless charging body having a front body to support said portable electronic device and a rear body coordinated with the front body to form a receiving cavity, said rear body defining therein a track in a form of a sliding slot with alternately arranged notched portions and toothed portions along a corresponding sliding edge thereof;
   a transmitter coil received in the receiving cavity; and
   a shaft transversely snugly disposed within the track and connected with the transmitter coil, said shaft being moveable to align the transmitter coil with the receiver coil.

2. The wireless charger claimed in claim 1, wherein said rear body has an inner face and an outer face, said track extend through the rear body along a direction perpendicular to the outer face, and said track has a plurality of serrated structures for mating with the shaft.

3. The wireless charger claimed in claim 2, further including a moving tray connected between the transmitter coil and the shaft.

4. The wireless charger claimed in claim 3, wherein said transmitter coil has a planar magnetic core and a plurality of spiral coils retained thereon, said planar magnetic core is retained to the moving tray, and said shaft is engaged with the moving tray.

5. The wireless charger claimed in claim 4, wherein said shaft includes a disk-shaped main body, a grip portion extending backwardly from the main body, and a mating block extending forwardly from the main body, said grip portion operable to move the mating block along the track.

6. The wireless charger claimed in claim 5, wherein said track is defined by two sliding edges, each of the sliding edges having said plurality of staggered notched portions and toothed portions.

7. The wireless charger claimed in claim 6, wherein said mating block includes a sliding body located within the track, a pair of positioning blocks respectively projecting toward the sliding edges, and a pair of locking hooks extending oppositely from a top edge and a bottom edge of the sliding body.

8. The wireless charger claimed in claim 7, wherein said moving tray has a pair of retaining hooks protruding backwardly therefrom to lock with the locking hooks.

9. The wireless charger claimed in claim 8, wherein said positioning blocks are retained in two opposing notched portions.

10. A standing wireless charger for use with a portable electronic device defining a long side and a short side, comprising:
    a body having a front side defining an upward receiving slot and a charging area which is located behind the receiving slot and is adapted to be intimately confronted by said portable electronic device;
    a transmitter coil located behind the charging area and moveable linearly relative to the receiving slot;
    a moving tray carrying the transmitter coil to move;
    a shaft operating said moving tray to move; and a track formed on the body in a form of an elongated sliding slot to guide movement of the shaft; wherein the shaft is transversely snugly disposed in and moveable along the sliding slot to drive the transmitter coil to a position for having the transmitter coil transversely aligned with a receiving coil in the portable electronic device corresponding to an orientation of the portable electronic device in the receiving slot.

11. The upstanding wireless charger as claimed in claim 10, wherein said shaft is discrete from while being engaged with the moving tray.

12. The upstanding wireless charger as claimed in claim 10, wherein said track is linear.

13. The upstanding wireless charger as claimed in claim 10, wherein the track forms a series of notched portions, and the shaft includes a pair of positioning blocks moveably received within the notched portions.

14. The upstanding wireless charger as claimed in claim 10, wherein said body further includes a rear side to support the front side in an upstanding manner.

15. The upstanding wireless charger as claimed in claim 10, wherein said receiving slot is dimensioned to be adapted to retain either said short side or said long side of the portable electronic device.

16. The upstanding wireless charger as claimed in claim 10, wherein the shaft includes a gripping portion exposed on a rear side of the body for manually operating the transmitting coil.

17. A method of charging a portable electronic device defining a long side and a short side thereof, comprising steps of:

providing a front body with an upward receiving slot and a transversely exposed charging area on a front face thereof; and providing a transmitting coil disposed in the front body and moveable up and down linearly with regard to the front body; wherein the receiving slot is dimensioned to be adapted to receive either the long side or the short side of the portable electronic device when the portable electronic device is either vertically or laterally positioned upon the front body in different orientations, so as to have the transmitting coil transversely aligned with a receiving coil of the portable electronic device.

18. The method as claimed in claim 17, further providing a tray carrying said transmitting coil and associated with a shaft, and a track on the front body along which the shaft is moveable up and down linearly.

19. The method as claimed in claim 18, wherein the track forms a series of notched portions, and the shaft forms a pair of positioning blocks moveably received within the notched portions.

20. The method as claimed in claim 18, wherein said shaft includes a gripping portion exposed upon a rear face of the front body opposite to said charging area.

* * * * *